(12) United States Patent
Lau

(10) Patent No.: US 8,924,454 B2
(45) Date of Patent: Dec. 30, 2014

(54) MERGED FLOATING POINT OPERATION USING A MODEBIT

(75) Inventor: David Yiu-Man Lau, San Jose, CA (US)

(73) Assignee: Arm Finance Overseas Limited, Cambridge (GB)

( * ) Notice: Subject to any disclaimer, the term of this patent is extended or adjusted under 35 U.S.C. 154(b) by 399 days.

(21) Appl. No.: 13/358,399

(22) Filed: Jan. 25, 2012

(65) Prior Publication Data

US 2013/0191426 A1    Jul. 25, 2013

(51) Int. Cl.
*G06F 7/483*    (2006.01)

(52) U.S. Cl.
USPC ........................................................ 708/501

(58) Field of Classification Search
None
See application file for complete search history.

(56) References Cited

U.S. PATENT DOCUMENTS

| | | | | |
|---|---|---|---|---|
| 7,290,023 | B2 * | 10/2007 | Dhong et al. | 708/501 |
| 7,774,393 | B1 * | 8/2010 | Brooks et al. | 708/204 |
| 8,626,813 | B1 * | 1/2014 | Swartzlander et al. | 708/501 |
| 2008/0256161 | A1 * | 10/2008 | Quinnell et al. | 708/501 |
| 2009/0177152 | A1 * | 7/2009 | Altman | 604/95.04 |
| 2010/0125621 | A1 * | 5/2010 | Oliver et al. | 708/620 |
| 2012/0124117 | A1 * | 5/2012 | Yu et al. | 708/205 |
| 2013/0191426 | A1 * | 7/2013 | Lau | 708/230 |
| 2013/0282784 | A1 * | 10/2013 | Oliver et al. | 708/501 |

* cited by examiner

*Primary Examiner* — David H Malzahn
(74) *Attorney, Agent, or Firm* — Patterson Thuente Pedersen, P.A.

(57) ABSTRACT

A first floating-point operation unit receives first and second variables and performs a first operation generating a first output. A first rounding unit receives and rounds the first output to generate a second output if a control bit is in a first state. A second floating-point operation unit receives a third variable and either the first output or the second output and performs a second operation on the third variable and either the first output or the second output, to generate a third output. The second floating-point operation unit receives and operates on the first output if the control bit is in the first state, or the second output if the control bit is in the second state. A second rounding unit receives and rounds the third output.

27 Claims, 3 Drawing Sheets

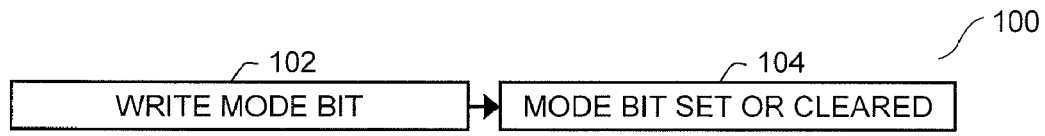
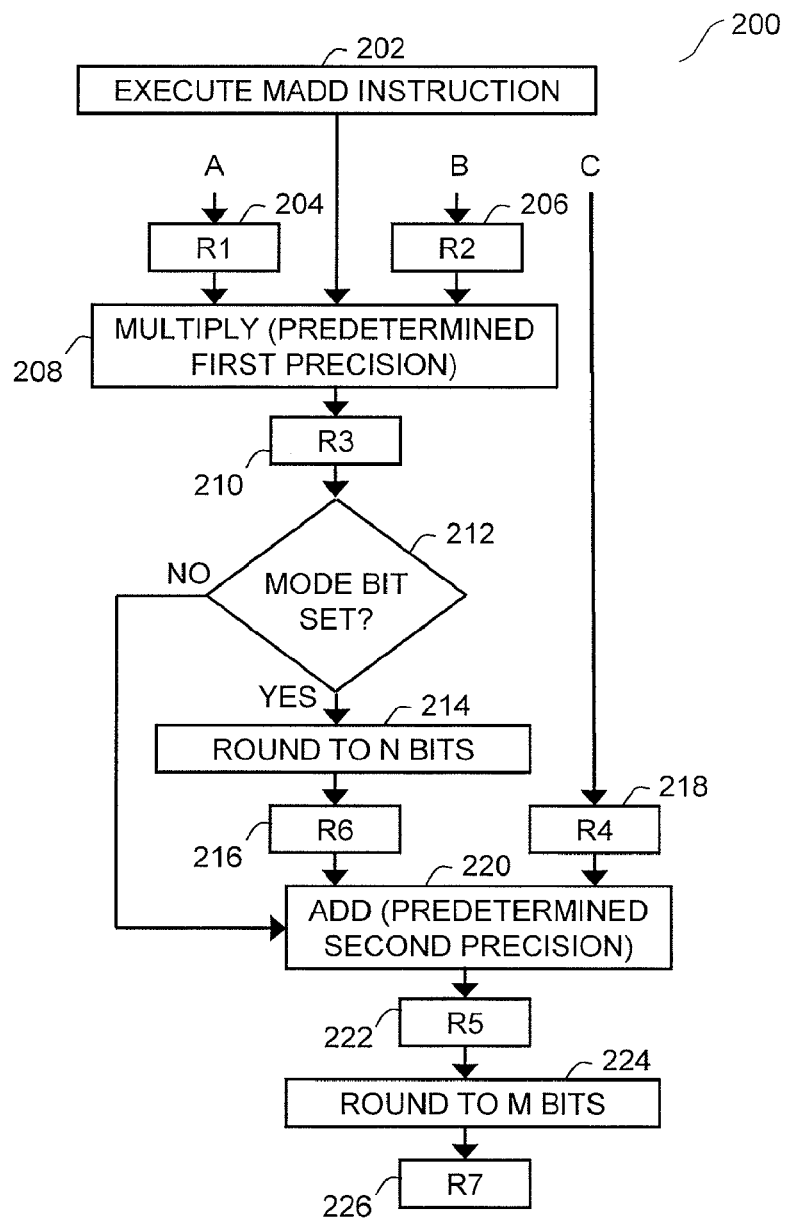

US 8,924,454 B2

MERGED FLOATING POINT OPERATION USING A MODEBIT

BACKGROUND

The present invention relates generally to floating-point processing systems and, more particularly to processing merged floating-point operations.

The ever shrinking dimensions of feature sizes on integrated circuits has enabled the integration of more circuits on the same silicon die at no additional cost. Such circuits have enabled new integrated circuit functionality thus leading to greater flexibility and enhanced computing capability.

Modern processor computing systems can execute a multitude of operations within their Instruction Set Architecture (ISA). Some processor ISAs perform floating-point arithmetic operations involving a wider range of values than can be supported by fixed-point or integer representation. Floating-point values are represented by a multitude of significant digits, called a significand, multiplied by a base raised to the power of an exponent. The number of significant digits in the significand is related to the precision of the value stored in the floating-point processing system.

BRIEF SUMMARY

According to one embodiment of the present invention, a floating-point processing system includes, in part, a first storage unit configured to store a control bit having a first state and a second state, and a first floating-point operation unit configured to receive a first floating-point variable and a second floating-point variable, and to perform a first floating-point operation on the first floating-point variable and the second floating-point variable so as to generate a first floating-point output. The first floating-point output has a first precision. The floating-point processing system further includes a first rounding unit responsive to the control bit and configured to receive and round the first floating-point output if the control bit is in the first state so as to generate a second floating-point output having a second precision being less than the first precision. The floating-point processing system further includes a second floating-point operation unit configured to receive a third floating-point variable, and either the first floating-point output if the control bit is in the first state or the second floating-point output if the control bit is in the second state. The second floating-point operation unit is further configured to perform a second floating-point operation on the third floating-point variable and either the first floating-point output or the second floating-point output so as to generate a third floating-point output having a third precision.

According to one embodiment, the floating-point processing system further includes a second rounding unit configured to receive and round the third floating-point output so as to generate a fourth floating-point output having a fourth precision less than the third precision.

According to another embodiment, the third precision is equal to the first precision. According to another embodiment, the first floating-point operation unit and the second floating-point operation unit are further configured to be responsive to a single instruction.

According to another embodiment, the first storage unit is further configured to store either the first state or the second state of the control bit during an initialization of the floating-point processing system. According to another embodiment, the first storage unit is further configured to store either the first state or the second state of the control bit responsive to an execution unit coupled to the floating-point processing system during execution of a program.

According to another embodiment, the first floating-point operation is floating-point multiplication or floating-point negate-multiplication. According to another embodiment, the second floating-point operation is floating-point addition or floating-point subtraction. According to another embodiment, the fourth precision is equal to the second precision.

According to one embodiment of the present invention, a method of processing a floating-point operation includes, in part, storing a control bit having a first state and a second state, and performing a first floating-point operation on a first floating-point variable and a second floating-point variable so as to generate a first floating-point output having a first precision. The method of processing a floating-point operation further includes, rounding the first floating-point output if the control bit is in the first state so as to generate a second floating-point output having a second precision being less than the first precision. The method of processing a floating-point operation further includes, performing a second floating-point operation on a third floating-point variable and either the first floating-point output if the control bit is in the first state or the second floating-point output if the control bit is in the second state so as to generate a third floating-point output having a third precision.

According to one embodiment of the present invention, the method of processing a floating-point operation further includes rounding the third floating-point output so as to generate a fourth floating-point output having a fourth precision being less than the third precision.

According to another embodiment, the steps of performing a first floating-point operation and performing a second floating-point operation are responsive to a single instruction.

According to another embodiment, the storing a control bit step stores either the first state or the second state of the control bit during an initialization of the floating-point processing system. According to another embodiment, the storing a control bit step stores either the first state or the second state of the control bit responsive to an execution unit coupled to the floating-point processing system during execution of a program.

According to one embodiment of the present invention, non-transitory computer readable storage medium including instructions defining logic blocks of a floating-point processing system, the computer readable storage medium adapted for use by an electronic design automation application executed by a computer where the logic blocks are configured to perform an operation including, in part, storing a control bit having a first state and a second state, and performing a first floating-point operation on a first floating-point variable and a second floating-point variable so as to generate a first floating-point output having a first precision. The method of processing a floating-point operation further includes, rounding the first floating-point output if the control bit is in the first state so as to generate a second floating-point output having a second precision being less than the first precision. The method of processing a floating-point operation further includes, performing a second floating-point operation on a third floating-point variable and either the first floating-point output if the control bit is in the first state or the second floating-point output if the control bit is in the second state so as to generate a third floating-point output having a third precision.

According to one embodiment of the present invention, the non-transitory computer readable storage medium further includes rounding the third floating-point output so as to generate a fourth floating-point output having a fourth precision being less than the third precision.

A better understanding of the nature and advantages of the embodiments of the present invention may be gained with reference to the following detailed description and the accompanying drawings.

BRIEF DESCRIPTION OF THE DRAWINGS

FIG. 1A illustrates a sequence for storing a control bit, according to one embodiment of the present invention.

FIG. 1B illustrates a sequence for executing a multiply-add instruction, according to one embodiment of the present invention.

DETAILED DESCRIPTION

Figure 2:
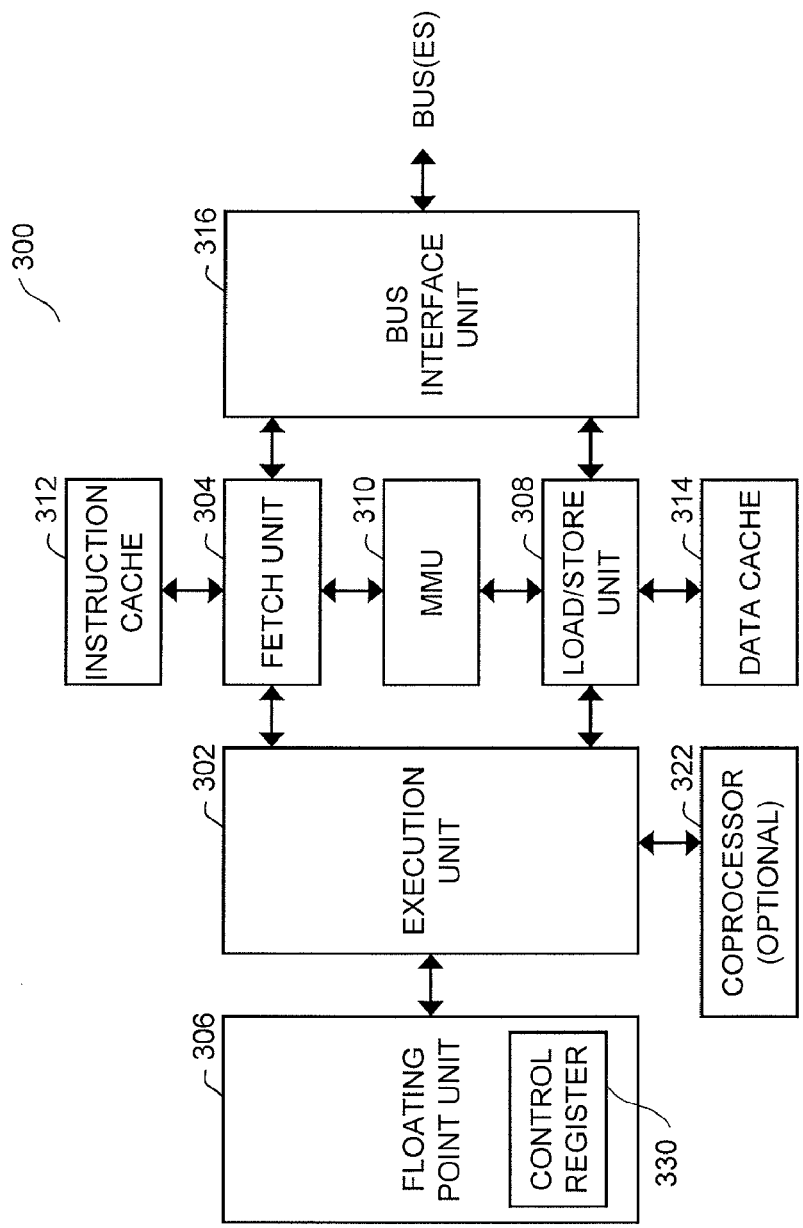
FIG. 2 is a simplified diagram of a number of blocks of an exemplary digital circuit or processor, according to an embodiment of the present invention.

A processor, in accordance with embodiments of the present invention, is configured to perform a number of floating point and rounding operations in response to one or more control bits. The floating point operations may be merged during the execution of the same instruction.

Merged floating point operations reduce the time required to execute the operation and are useful in many applications, for example, to speed up graphics processing. Individual floating point operations may be executed with greater precision within the unit executing the floating point operation compared to the precision available outside the unit executing the floating point operation. The reduction in precision after a floating point operation is accomplished by rounding the floating point number. A merged floating point operation may thus have one or more rounding steps potentially available during its implementation. Since the floating point value generated as a result of the merged floating point operation depends on which of the multitude of available rounding options are used, it is desirable to have control over the rounding option used. It is also desirable to maintain backward compatibility to existing ISAs using merged floating point operations which may implement the rounding with only one option.

The following embodiments describe, by way of example, a multiply-add (MADD) type merged floating point operation, which combines a floating point multiply operation followed by a floating point add operation. Other examples of merged floating point operations include multiply-subtract (MSUB), negate-multiply-add (NMADD), and negate-multiply-subtract (NMSUB). It is understood however that embodiments of the present invention have a broader range of applicability. For example, any two floating point operations may be combined into a merged floating point operation. For example, a first floating point operation may be followed by a second floating point operation, where both first and second floating point operations are invoked by a single instruction or command.

In accordance with one embodiment, a floating-point processing system includes a storage unit for storing a control bit. A first floating-point operation unit receives first and second variables (representing first and second numbers) and performs a first operation generating a first output. A first rounding unit receives and rounds the first output to generate a second output if the control bit is in a first state. A second floating-point operation unit receives a third variable and either the first output or the second output, and performs a second operation on the third variable and either the first output or the second output, to generate a third output. The second floating-point operation unit receives and operates on the first output if the control bit is in the first state, or the second output if the control bit is in the second state. A second rounding unit receives and rounds the third output.

FIG. 1A illustrates a sequence 100 for storing a control bit (hereinafter alternatively referred to as modebit or mode bit), according to one embodiment of the present invention. A write mode bit instruction 102 may be issued by the execution unit of a processor, described further below. The mode bit may have a first state and a second state. In one embodiment, the first state of the modebit may be a set state and the second state of the modebit may be a cleared state. Alternatively, in another embodiment, the first state of the modebit may be a cleared state and the second state of the modebit may be a set state.

Next, the modebit may be set or cleared 104 to store a control bit having a first state and a second state in a first storage unit, described further below. In another embodiment, the first storage unit stores either the first state or the second state of the control bit during an initialization of the floating-point processing system. According to another embodiment, the first storage unit stores the control bit on-the-fly before executing the merged floating-point operation.

FIG. 1B illustrates a sequence 200 for executing a multiply-add instruction, according to one embodiment of the present invention. An execution unit, described further below, issues an execute MADD instruction 202 which is received by the floating point unit, described further below. Floating-point values A and B may be loaded 204 and 206 into registers R1 and R2, respectively, anytime before, during, or after the execution of MADD instruction 202. If by the time the execute MADD instruction is received, registers R1 and R2 have been loaded with floating-point values A and B respectively, a multiply operation 208 is performed to multiply values A and B so as to generate a high precision floating-point output representing the result of the multiplication operation. The precision of the floating-point operation may be high to better preserve the accuracy of the calculation. The high precision may, for example, be 2N bits where N is an integer greater than 0. The output of the first floating point operation, (for example, the product of floating-point values A and B) may then be loaded 210 into register R3 using high precision.

If the modebit is determined 212 to be in a first state (for example if the modebit is set) then the output of the first floating point operation (in this example, the product of floating-point values A and B) may be rounded 214 from a high precision to a lower precision. For example, the 2N bit precision of the product of floating-point values A and B may be rounded so as to generate a lower precision of N bits. The precision N may be predetermined by data bus width, register width, or other constraints of the processor system design. Rounding 214 the precision of the result of the first floating-point operation before proceeding to the second floating-point operation may produce the same numerical result as performing a non-merged sequential sequence of the first and second floating-point operations. The result of rounding 214 is then loaded 216 into register R6. The merged floating-point operation with rounding 214 may be called "non-fused behavior."

Register R4 is loaded with a floating-point value C anytime before, during, or after the loading of register R6. If registers R6 and R4 have been loaded 216 and 218, floating-point value C and the rounded output of the first floating point operation may be received and operated upon by a second floating point operation (which, in this example, is an add operation 220) using a second high precision. The second high precision may be equal or not equal to the first high precision. For example, the second high precision may be 2N bits or it may be 2M bits where M is an integer greater than 0.

If, on the other hand, the modebit is determined 212 to be in a second state (for example if the modebit is cleared) then the product of floating-point values A and B may not be rounded 214 and is instead output from register R3 at high precision and received by the second floating-point operation, which in this example is floating point add operation 220. Not rounding the precision of the result of the first floating-point operation before proceeding to the second floating-point operation may produce a different and possibly more accurate numerical result compared to performing a non-merged sequence of the first and second floating-point operations. The merged floating-point operation without rounding 214 may be called "fused behavior."

Setting the state of the control bit enables the accuracy of the merged floating-point operation to be selectable, while simultaneously enabling a single op-code to invoke the merged floating-point operation. In one embodiment, the state of the control bit may be set in a state so as to produce the same result as would have been produced before applying the embodiments described herein. For example, if rounding 214 between the first and second floating point operations was originally done in an older ISA, the state of the control bit could be set so as to execute rounding 214 as a default condition. It is thus possible to maintain backwards compatibility to an older ISA while still allowing merged floating-point operations at higher numeric accuracy.

The output of the second floating point operation (for example, the summation produced as a result of floating-point add 220) may then be loaded 222 into register R5 using high precision. Then the output of the second floating point operation (which, in this example, is the summation output of floating-point add 220) may be rounded 224 from a high precision to a lower precision. For example, the 2M bit precision of the summation output of floating-point add 220 may be rounded so as to generate a lower precision of M bits. In one embodiment, M may equal N. The result of rounding 224 is then loaded 226 into register R7.

The operational behavior described by sequence 200 may be capable of pipelined operation, which allows sequence 200 to operate upon a first set of floating point variables or their results in the second floating point operation while also operating on a second set of new variables in the first floating point operation. The pipelined operation may thus speed up computational performance. In accordance with one embodiment, the fused behavior embodiment described above may further speed up performance of the floating point pipeline for sequence 200 since determination of the mode bit 212 may be accomplished any time before or concurrently with the first floating-point operation (which, in this example, is floating-point multiply operation 208) so as not to slow down the pipeline. For example, determination of the mode bit 212 may not delay routing data from register R3 to floating-point add operation 220. In other words, register R3 may be loaded 210 concurrently, or in the same machine cycle, as register R4 may be loaded 218. Then, floating-point value C and the non-rounded output of the first floating point operation may be received and operated upon by the second floating point operation (which, in this example, is floating-point add operation 220) in the next machine cycle since determination of the mode bit 212 was accomplished earlier. Thus the fused behavior embodiment described above may save two machine cycles compared to the non-fused behavior embodiment described above.

FIG. 2 is a simplified diagram of a number of blocks of an exemplary digital circuit or processor 300, according to an embodiment of the present invention. It is understood however that the embodiments of the present invention have a broader range of applicability. For example, the present invention is not limited to the processor architecture shown in FIG. 2, since any digital circuit or processor ISA that includes operations using values stored in floating-point representation in its ISA may also benefit from the embodiments as described herein.

Processor 300 includes an execution unit 302, a fetch unit 304, a floating point unit 306, a load/store unit 308, a memory management unit (MMU) 310, an instruction cache 312, a data cache 314, a bus interface unit 316, and an optional coprocessor 322. Registers R1-R7 described with reference to FIG. 1B may be located within floating point unit 306 or elsewhere within processor 300. The floating-point multiply and add circuits described with reference to FIG. 1B may be located in floating point unit 306. The design and operation of these elements of processor 300 are known to persons skilled in the relevant art(s). These elements of processor 300 are illustrative and not intended to limit the present invention.

According to one embodiment of the present invention, as shown in FIG. 2, floating point unit 306 includes a control register 330. The floating point unit is responsive to the state of at least one control bit stored in the control register. In other alternative embodiments of the present invention, the control register may be located in other units of the processor system.

Figure 3:
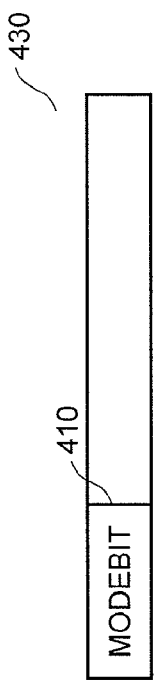
FIG. 3 is a simplified diagram of an exemplary control register, according to an embodiment of the present invention.

FIG. 3 is a simplified diagram of an exemplary control register 430, according to an embodiment of the present invention. Control register 330, shown in FIG. 2, may be the same register as control register 430, shown in FIG. 3. Referring to FIG. 3, control register 430 may include a modebit 410, which is a control bit having a first state and a second state. In other alternative embodiments of the present invention, the control bit for the floating point unit may be stored in a first storage unit, which may be a register, memory, cache, firmware, or software stored in a non-transitory computer readable storage medium. In one embodiment, the first storage unit may be configured to store either the first state or the second state of the control bit during an initialization of the floating-point processing system. For example, the first storage unit may store the control bit during execution of an initial system power-up, reset, interrupt, or exception fault handling operation. In another embodiment, the first storage unit may be configured to store either the first state or the second state of the control bit in response to the execution unit coupled to the floating-point processing system during execution of a program on-the-fly, before executing the merged floating-point operation.

Figure 4:
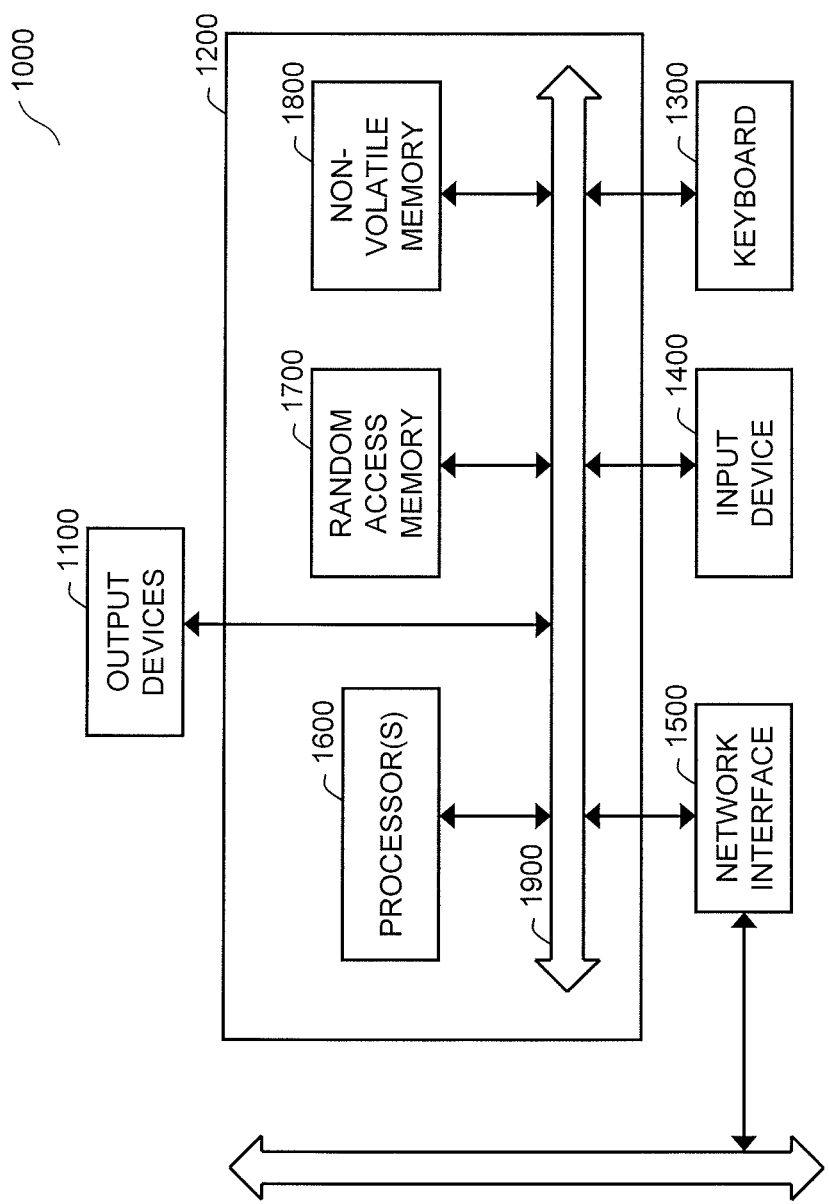
FIG. 4 is an exemplary computer system in which the present invention may be embodied.

FIG. 4 is an exemplary computer system 1000 in which the present invention may be embodied. Computer system 1000 typically includes one or more output devices 1100, including display devices such as a CRT, LCD, OLED, LED, gas plasma, electronic ink, or other types of displays, speakers and other audio output devices; and haptic output devices such as vibrating actuators; computer 1200; a keyboard 1300; input devices 1400; and a network interface 1500. Input devices 1400 may include a computer mouse, a trackball, joystick, track pad, graphics tablet, touch screen, microphone, various sensors, and/or other wired or wireless input devices that allow a user or the environment to interact with computer system 1000. Network interface 1500 typically provides wired or wireless communication with an electronic communications network, such as a local area network, a wide area network, for example the Internet, and/or virtual networks, for example a virtual private network (VPN). Network interface 1500 can implement one or more wired or wireless networking technologies, including Ethernet, one or more of the 802.11 standards, Bluetooth, and ultra-wideband networking technologies.

Computer 1200 typically includes components such as one or more general purpose processor(s) 1600, and memory storage devices, such as a random access memory (RAM) 1700 and non-volatile memory 1800. Non-volatile memory 1800 can include floppy disks; fixed or removable hard disks; optical storage media such as DVD-ROM, CD-ROM, and bar codes; non-volatile semiconductor memory devices such as flash memories; read-only-memories (ROMS); battery-backed volatile memories; paper or other printing mediums; and networked storage devices. System bus 1900 interconnects the above components. Processor(s) 1600 may be a floating-point processing system such as processor 300 described above.

RAM 1700 and non-volatile memory 1800 are examples of non-transitory tangible media for storage of data, audio/video files, computer programs, applet interpreters or compilers, virtual machines, and embodiments of the present invention described above. For example, the above described embodiments of the processors of the present invention may be represented as non-transitory computer-usable programs and data files that enable the design, description, modeling, simulation, testing, integration, and/or fabrication of integrated circuits and/or computer systems. Such non-transitory programs and data files may be used to implement embodiments of the invention as separate integrated circuits or used to integrate embodiments of the invention with other components to form combined integrated circuits, such as microprocessors, microcontrollers, system on a chip (SoC), digital signal processors, embedded processors, or application specific integrated circuits (ASICs).

Programs and data files expressing embodiments of the present invention may use general-purpose programming or scripting languages, such as C or C++; hardware description languages, such as VHDL or Verilog; microcode implemented in RAM, ROM, or hard-wired and adapted to control and coordinate the operation of components within a processor or other integrated circuit; and/or standard or proprietary format data files suitable for use with electronic design automation software applications known in the art. Such program and data files when stored in a non-transitory tangible medium can cause embodiments of the present invention at various levels of abstraction. Programs and data files can express embodiments of the invention at various levels of abstraction, including as a functional description, as a synthesized netlist of logic gates and other circuit components, and as an integrated circuit layout or set of masks suitable for use with semiconductor fabrication processes. These programs and data files can be processed by electronic design automation software executed by a computer to design a processor and generate masks for its fabrication. Those of ordinary skill in the art will understand how to implement the embodiments of the present invention in such programs and data files.

Further, embodiments of computer 1200 may include specialized input, output, and communications subsystems for configuring, operating, simulating, testing, and communicating with specialized hardware and software used in the design, testing, and fabrication of integrated circuits.

Although some exemplary embodiments of the present invention are made with reference to a processor having one execution unit, it is understood that the processor may have more than one execution unit. The arrangement and the number of the various devices shown in the block diagrams are for clarity and ease of understanding. It is understood that combinations of blocks, additions of new blocks, re-arrangement of blocks, and the like fall within alternative embodiments of the present invention. For example, any number of control registers, floating-point units, processors, system memories, caches, or cache-less execution units may also be used.

It is understood that the apparatus and methods described herein may be included in a semiconductor intellectual property core, such as a microprocessor core (e.g. expressed as a hardware description language description or a synthesized netlist) and transformed to hardware in the production of integrated circuits. Additionally, the embodiments of the present invention may be implemented using combinations of hardware and software, including micro-code suitable for execution within a processor.

The above embodiments of the present invention are illustrative and not limitative. Various alternatives and equivalents are possible. The invention is not limited by the type of integrated circuit in which the present disclosure may be disposed. Nor is the invention limited to any specific type of process technology, e.g., CMOS, Bipolar, BICMOS, or otherwise, that may be used to manufacture the various embodiments of the present invention. Nor is the invention limited to any specific type of non-transitory data store that stores the control bit. Nor is the invention limited to any specific type or combination of floating-point operations combined into the merged floating-point operation. Other additions, subtractions or modifications are obvious in view of the present invention and are intended to fall within the scope of the appended claims.

What is claimed is:

1. A floating-point processing system comprising:
a first storage unit configured to store a control bit having a first state and a second state;
a first floating-point operation unit configured to receive a first floating-point variable and a second floating-point variable, and to perform a first floating-point operation on the first floating-point variable and the second floating-point variable so as to generate a first floating-point output having a first precision;
a first rounding unit responsive to the control bit and configured to receive and round the first floating-point output if the control bit is in the first state so as to generate a second floating-point output having a second precision being less than the first precision; and
a second floating-point operation unit configured to receive a third floating-point variable, and either the first floating-point output if the control bit is in the second state or the second floating-point output if the control bit is in the first state, the second floating-point operation unit further configured to perform a second floating-point operation on the third floating-point variable and either the first floating-point output or the second floating-point output so as to generate a third floating-point output having a third precision.

2. The floating-point processing system of claim 1 further comprising a second rounding unit configured to receive and round the third floating-point output so as to generate a fourth floating-point output having a fourth precision less than the third precision.

3. The floating-point processing system of claim 2 wherein the fourth precision is equal to the second precision.

4. The floating-point processing system of claim 1 wherein the third precision is equal to the first precision.

5. The floating-point processing system of claim 1 wherein the first floating-point operation unit and the second floating-point operation unit are further configured to be responsive to a single instruction.

6. The floating-point processing system of claim 1 wherein the first storage unit is further configured to store either the first state or the second state of the control bit during an initialization of the floating-point processing system.

7. The floating-point processing system of claim 1 wherein the first storageunit is further configured to store either the first state or the second state of the control bit responsive to an execution unit coupled to the floating-point processing system during execution of a program.

8. The floating-point processing system of claim 1 wherein the first floating-point operation is floating-point multiplication or floating-point negate-multiplication.

9. The floating-point processing system of claim 1 wherein the second floating-point operation is floating-point addition or floating-point subtraction.

10. A method of processing a floating-point operation comprising:
    storing a control bit having a first state and a second state;
    performing a first floating-point operation on a first floating-point variable and a second floating-point variable so as to generate a first floating-point output having a first precision;
    rounding the first floating-point output if the control bit is in the first state so as to generate a second floating-point output having a second precision being less than the first precision; and
    performing a second floating-point operation on a third floating-point variable and either the first floating-point output if the control bit is in the second state or the second floating-point output if the control bit is in the first state so as to generate a third floating-point output having a third precision.

11. The method of claim 10 further comprising rounding the third floating-point output so as to generate a fourth floating-point output having a fourth precision being less than the third precision.

12. The method of claim 11 wherein the fourth precision is equal to the second precision.

13. The method of claim 10 wherein the third precision is equal to the first precision.

14. The method of claim 10 wherein the steps of performing a first floating-point operation and performing a second floating-point operation are responsive to a single instruction.

15. The method of claim 10 wherein the storing a control bit step stores either the first state or the second state of the control bit during an initialization of the floating-point processing system.

16. The method of claim 10 wherein the storing a control bit step stores either the first state or the second state of the control bit responsive to an execution unit coupled to the floating-point processing system during execution of a program.

17. The method of claim 10 wherein the first floating-point operation is floating-point multiplication or floating-point negate-multiplication.

18. The method of claim 10 wherein the second floating-point operation is floating-point addition or floating-point subtraction.

19. A non-transitory computer readable storage medium including instructions defining logic blocks of a floating-point processing system, the computer readable storage medium adapted for use by an electronic design automation application executed by a computer, wherein the logic blocks are configured to perform an operation comprising:
    storing a control bit having a first state and a second state;
    performing a first floating-point operation on a first floating-point variable and a second floating-point variable so as to generate a first floating-point output having a first precision;
    rounding the first floating-point output if the control bit is in the first state so as to generate a second floating-point output having a second precision being less than the first precision; and
    performing a second floating-point operation on a third floating-point variable and either the first floating-point output if the control bit is in the second state or the second floating-point output if the control bit is in the first state so as to generate a third floating-point output having a third precision.

20. The non-transitory computer readable storage medium of claim 19 further comprising rounding the third floating-point output so as to generate a fourth floating-point output having a fourth precision being less than the third precision.

21. The non-transitory computer readable storage medium of claim 20 wherein the fourth precision is equal to the second precision.

22. The non-transitory computer readable storage medium of claim 19 wherein the third precision is equal to the first precision.

23. The non-transitory computer readable storage medium of claim 19 wherein the steps of performing a first floating-point operation and performing a second floating-point operation are responsive to a single instruction.

24. The non-transitory computer readable storage medium of claim 19 wherein the storing a control bit step stores either the first state or the second state of the control bit during an initialization of the floating-point processing system.

25. The non-transitory computer readable storage medium of claim 19 wherein the storing a control bit step stores either the first state or the second state of the control bit responsive to an execution unit coupled to the floating-point processing system during execution of a program.

26. The non-transitory computer readable storage medium of claim 19 wherein the first floating-point operation is floating-point multiplication or floating-point negate-multiplication.

27. The non-transitory computer readable storage medium of claim 19 wherein the second floating-point operation is floating-point addition or floating-point subtraction.

* * * * *